Feb. 11, 1947.  E. A. JOHNSON  2,415,636
METHOD AND APPARATUS FOR LOGGING WELLS
Filed May 29, 1942  2 Sheets-Sheet 2

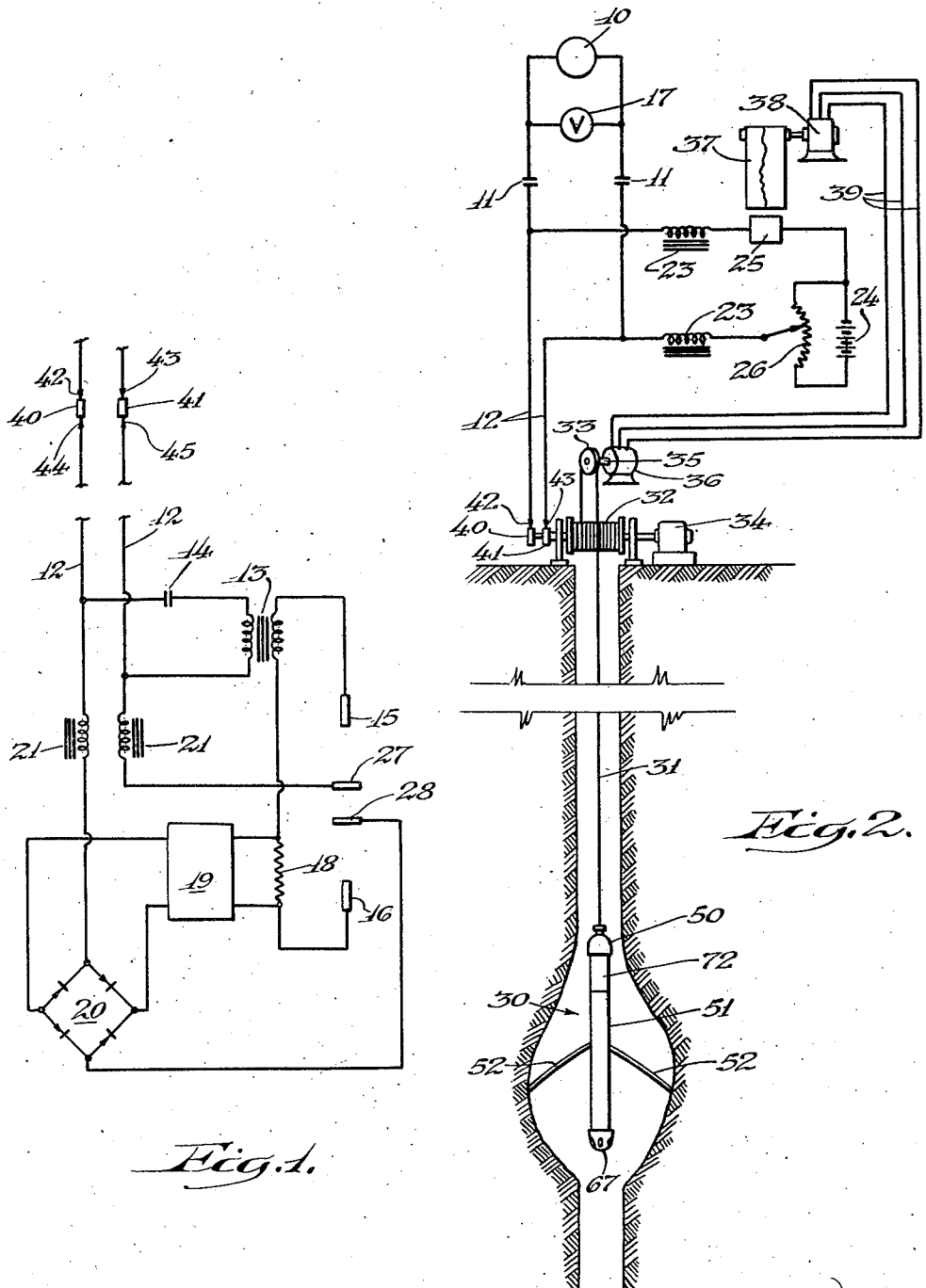

Inventor:
Everett A. Johnson
By Pike H. Sullivan
Attorney.

Patented Feb. 11, 1947

2,415,636

UNITED STATES PATENT OFFICE 2,415,636

METHOD AND APPARATUS FOR LOGGING WELLS

Everett A. Johnson, Park Ridge, Ill., assignor to Standard Oil Company, Chicago, Ill., a corporation of Indiana Application May 29, 1942, Serial No. 445,024

5 Claims. (Cl. 175—182)

This invention relates to the art of well logging and more particularly deals with the automatic correction of a primary log. Still more particularly it pertains to the logging of the character and volume of fluid within a well bore.

The various methods of well logging, for example natural potential, specific resistivity, gamma ray, and neutron logging are now well known and their place has been established in the oil industry. It has been found that the accuracy of these logs is affected by the character of the fluid within the well bore as well as the variations in the volume of the fluid as indicated by the variations in the diameter of the well bore. The effects of the change in fluid characteristics and volume on a primary log cannot be neglected. In fact it has been found that an appreciable change in either of these variables can mask a change in formation, thus reducing the value of the primary log of the formation.

When a logging instrument is lowered into a deep well, there is an appreciable stretch in the cable. On deep wells, for instance, it has been found that this stretch of the cable amounts to between 5 and 25 feet depending upon a number of variables such as weight of the logging instrument, the nature of the cable, the fluid velocity and density, etc. Hence identical positions of two logging instruments lowered individually into a well are difficult to attain. Although the measuring device might indicate an apparent equal depth, the variations in actual level frequently differ as much as 10 or 15 feet, making it impossible to correlate accurately readings from this strata. There seems little doubt that many narrow veined oil deposits have been overlooked by failure to correlate logs of fluid characteristics and diameter of the well bore at the point of measurement.

Furthermore, certain characteristics of well fluids and strata are transitory or continuously varying and it is impractical, if not impossible, to correlate logs when the measurements are taken at substantially different times.

It is, therefore, an object of this invention to provide a method and means for obtaining an electrical resistivity well log which is modified to include the effect of variations in the diameter of the well bore. A further object is to provide a method and means for logging variations in the volume of uniform linear increments of the well fluid. Another object is to provide a method and means for obtaining a comparative log which has been modified by the effect of differences in the character or volume of the fluid in the well bore.

An additional object is to provide a method and means for logging variations in diameter of the well bore in terms of a known and measurable characteristic of the well fluid. A more specific object of my invention is to provide a method and apparatus for first obtaining a resistivity log of a well independent of variations in diameter and for logging variations of uniform linear increments of the fluids by a single round trip through the well bore. These and other objects will become apparent from the following description taken with the accompanying drawings which form a part of this specification and are to be read conjointly therewith, in which:

Figure 1 diagrammatically illustrates one form of the invention;

Figure 2 shows schematically an arrangement of the apparatus according to my invention;

Figure 3:
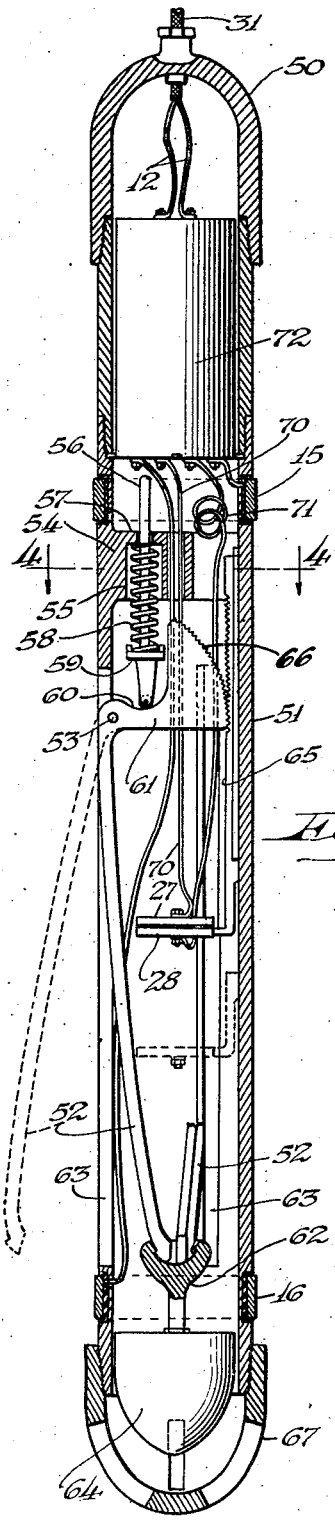
Figure 3 is a vertical section illustrating diagrammatically one embodiment of my invention.

Referring to the drawings, a constant potential is applied by alternator 10 through condensers 11 to conductors 12, energizing transformer 13 through condenser 14 so that alternating current is applied through resistance 18 across electrodes 15 and 16 thereby maintaining a constant potential difference across these elements, the magnitude of the drop being proportional to the reading of voltmeter 17. Changes in the potential drop across resistance 18 connected between electrodes 15 and 16 indicate changes in the resistivity of the fluid and/or formation. This potential drop can be amplified and rectified by amplifier 19 and full-wave rectifier 20, respectively, into a direct potential so that it can be transmitted without interference to the surface over the same leads 12 which are used to transmit power to the logging device.

The direct potential measuring circuit includes two electrodes 27 and 28 exposed to the well fluids and relatively movable from direct mutual engagement to a spacing equivalent to about one well bore diameter. When in contact these electrodes have no effect on the measuring circuit which then affords a known type of primary resistivity log. When the electrodes are separated however, they afford by virtue of the well fluid between them and to which they are exposed a conductivity cell, the resistance of which varies as a function of the salinity of the well fluid. This conductivity cell constitutes a resistance in series with the direct potential measuring circuit.

Its effect on that circuit varies therefore with the salinity of the well fluid. The resistance of this cell may be further varied by relative movement of the electrodes. A caliper device responding to diameter variations of the well bore is so linked to the movable electrode that well bore variations effect movement of that electrode, to vary the cell resistance as a function of the bore diameter. When the salinity of well fluid is constant, this electrode movement and consequent variation of the fluid resistance between electrodes is proportional to well bore diameter variation. Use of such a cell in these conditions therefore applies to the direct potential measuring circuit a corrective factor which offsets the effect on a primary resistivity log of well bore diameter variation, to afford a corrected or modified resistivity log more accurately representing the true resistivity of the medium being investigated. Hence the output of rectifier 20 is modified by changes in fluid volume and conductivity within each uniform linear increment of the well bore, and the total is transmitted to the surface over conductors 12. Choke coils 21 isolate the rectifier 20 from the alternating current in leads 12 according to well known usage. The condenser 14 is utilized to keep direct current from flowing through the primary of transformer 13 thus preventing saturation of the coil. At the surface, condensers 11 and choke coils 23 separate the power and recording potentials.

The recording circuit at the surface in the embodiment illustrated also comprises a battery 24, a detecting device 25 such as an oscillograph galvanometer, and a variable resistance 26 forming with battery 24 a voltage divider which can be used to obtain a zero adjustment of the single trace recording which in this case will be a primary resistivity curve corrected for both volume and change in resistivity of the fluid.

The potential drop across resistance 18 is affected by the volume of fluid in the well within the uniform linear increment defined by the spacing of relatively fixed electrodes 15 and 16, which preferably are spaced apart of the order of between about two and five diameters of the well bore.

This circuit corrects the primary resistivity for the effects of varying resistivity due to varying fluid character, that is, the total resistivity due to the formation resistivity as well as the character and volume of the fluid in the hole. Likewise, a means is provided whereby electrodes 27 and 28 are controllably in electrical contact (when the caliper arms 52 are within the body 51) and the electrodes 15 and 16 are relatively fixed as before. In this way an uncorrected resistivity log can be obtained.

Referring to Figure 2, the combination logging device 30 adapted to be lowered into a well bore containing fluids can be supported by a suitable insulated cable 31. The cable 31 can be wound onto a reel 32 at the surface in a manner well known in this art. Thus the cable 31 passes over a measuring sheave 33 and a drum or reel 32 driven by motor 34 as the logging instrument is moved through the well. The measuring sheave 33 is connected through suitable mechanical connections, represented by the shaft 35, with Selsyn generator 36, the function of which is to maintain synchronism between the cable 31 and the recording medium 37. The recording medium is driven by Selsyn motor 38 which is kept in synchronism with generator 36 by conductors 39. The electrical conductors 12 are electrically connected with slip rings 40 and 41 exterior of drum 32. Brushes 42 and 43 contact the slip rings 40 and 41 respectively and are connected to the measuring and recording circuit. Any suitable electrical measuring and recording means may be used. Other methods of correlating the recorder operation with the movement of the logging device along the well bore can be used, as for example a belt and pulley arrangement not shown.

Figure 4:
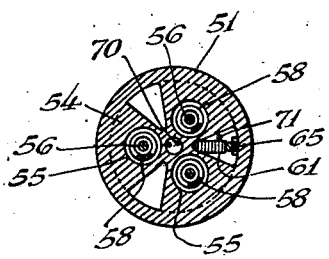
Figure 4 is a section taken along the line 4—4 in Figure 3.

The apparatus diagrammatically represented in the circuit diagram of Figure 1 can incorporate a logging device illustrated in Figure 3 of the drawings. Thus, referring to Figures 3 and 4, the device illustrated comprises a conductor and supporting cable 31 attached to the head 50 which in turn is attached to the body 51. A plurality of caliper arms 52 are pivotably attached to the body 51 by means of pins 53. The upper end of body 51 is provided with a spider 54 which may be integral with the body 51 or may comprise a separate segment attached thereto. The spider 54 is provided with longitudinal chambers 55, the upper ends of plungers 56 slidably extending into the chambers 55. The chambers 55 are reduced in cross section at their upper ends to provide shoulders 57 upon which springs 58 rest. Each of the plungers 56 has a flange 59 which engages the lower end of coil spring 58. Each plunger 56 having a roller at its lower end is urged downwardly into engagement with the surface 60 on the upper end of caliper arm 52. The surface 60 engaged by the spring loaded plunger 56 constantly urges the free end of caliper arm 52 outwardly of the body 51 so that when the caliper arms are released as described below they will be pressed against the walls of the well bore as illustrated in Figure 2.

A trigger mechanism is provided for controllably releasing the caliper arms into an operative position. A weighted trigger 62 normally holds the caliper arms 52 within the body 51 for easy downwardly passage of the logging device within a well bore. Longitudinal slots 63 accommodate the caliper arms and permit the flow of well fluid within the logging device. Additional means for flow of the well fluid within the conductivity cell can be provided.

In preparing the logging device for passage within the well bore the caliper arms 52 are held within the body 51 thereby compressing springs 58 within the chambers 55. The trigger 62 is set and the nose 67 is fixed to the body 51. Jarring the logging device causes the weight 64 to drop thereby releasing trigger 62 and the arms 52 are urged outwardly by spring loaded plungers 56 into contact with the wall of the well bore.

As the position of the caliper arms 52 is changed the toothed sector 61, which is carried by at least one of the arms 52, engages the teeth 66 on plunger 65, and oscillates about the pin 53. One end of plunger 65 carries an electrode 28 and cooperates with a relatively fixed electrode 27.

The electrodes 15 and 16 are illustrated as comprising annular members at both ends of the body 51. These electrodes are insulated from the body when necessary. The body, however, can be made of non-conducting material. The insulated conductors 70 and 71 lead toward the upper end of the body 51 and enter the water-tight amplification and rectification zone 72. The amplification and rectification apparatus is diagrammatically illustrated in the circuit diagram of Figure 1 and has been described in connection therewith. Since the specific apparatus forms no part of the present invention it is not shown in detail at 72 and will not be further described herein. The recording potential is carried from the amplification and rectification zone 72 by conductors 12 in cable 31. The power to electrodes 15 and 16 is carried to the logging instrument by conductors 12 in cable 31 as described in connection with the power circuit illustrated in Figures 1 and 2.

The logging method and the operation of the logging device described herein is believed to be apparent from the above description.

When the illustrated device passes downwardly within the well bore, caliper arms 52 are held within slots 63 by means of trigger 62. On the downward trip the instrument can be used to obtain a primary log. In making this primary log the circuit is as shown and described in connection with Figure 1, electrodes 27 and 28 being in circuit closing contact. At the bottom of the well bore or at any selected intermediate point, the instrument is jarred to release trigger 62. Other means can be used in place of the trigger arrangement shown in the drawings. The caliper arms 52 are then in operative position. The caliper arms can be of any suitable material, preferably wear resistant, light weight and non-conducting or electrical insulating material. Wooden arms with wear resistant contact faces can be used. With changes in position of the caliper arms varying electrical signals are transmitted and recorded as described in connection with Figures 1 and 2. A comparison between the two logs thus obtained also indicates the direct variations in diameter of the well bore when the salinity of the well fluids at a given level remains unchanged. A separate calipering log can be made if desired using my invention as described above when the salinity of the well fluids is unknown.

While I have described a primary log corrected for certain variations it is to be understood that I propose to correct automatically a primary log with reference to any variable which appears in oil or gas wells and which may affect a primary well log. It is to be understood that although I have described my invention with particular reference to particular illustrative embodiments the scope of the invention is defined only by the appended claims.

I claim:

1. In a well surveying device adapted to be passed within a bore hole containing well fluids, an apparatus comprising an electrical circuit including a pair of relatively movable electrodes exposed to the well fluid, movable means adapted to follow the contour of the wall of the bore hole and for moving at least one of said electrodes relative to the other proportional to the well diameter, electrically operated indicating means at the surface, said electric circuit including said electrodes and said indicating means whereby the relative spacing of the electrodes modifies the electrical balance within the circuit to indicate the variations in the diameter of the bore hole.

2. A method of logging a bore hole containing fluid, comprising passing an electrical current between two relatively fixed points in said fluid, producing an electrical potential proportional to the impedance to flow of said electrical current, impressing said potential between two relatively movable points in said fluid, varying the distance between said movable points with the diameter of bore hole, and measuring the flow of current between said two relatively movable points due to said electrical potential.

3. A well surveying device adapted to pass within a well bore containing well fluids, said device comprising a pair of relatively movable electrodes exposed to the well fluid and included within an electrical circuit, wall contacting means for following the contour of the bore hole, and connecting means between said movable electrode means and said contacting means, said contacting means thereby being adapted to move at least one of said electrodes relatively to the other a distance proportional to the well diameter.

4. In a well surveying device, an apparatus adapted to pass within a well bore containing well fluids comprising an electrical circuit, a pair of relatively movable electrodes exposed to the well fluid, wall contacting means for following the contour of the bore hole, connecting means between at least one of said electrodes and said contacting means, said contacting means being adapted to move at least one of said electrodes relatively to the other a distance proportional to the well diameter, and electrical indicating means at the surface, said electrical circuit including said electrodes and said electrical means.

5. An apparatus for logging a well containing well fluids including a fixed pair of longitudinally spaced electrode means connected in an electrical circuit, a relatively movable pair of electrode means connected in said circuit and exposed to the well fluids between said fixed pair of electrode means, caliper means for following the contour of the wall of the well, connecting means between at least one of said electrode means and said caliper means whereby radial movement of said caliper means causes movement of said one of the electrode means and releasable means for retaining said caliper means in an inoperative position whereby said movable electrodes are initially maintained in electrical contact.

EVERETT A. JOHNSON.

REFERENCES CITED

The following references are of record in the file of this patent:

UNITED STATES PATENTS

| Number | Name | Date |
|---|---|---|
| 2,267,110 | Kinley et al. | Dec. 23, 1941 |
| 2,102,080 | Kinley | Dec. 14, 1937 |
| 2,269,269 | Jessen | Jan. 6, 1942 |
| 1,520,004 | Bloch | Dec. 23, 1924 |
| 1,708,354 | Cabot | Apr. 9, 1929 |
| 2,225,668 | Subkow et al. | Dec. 24, 1940 |
| 2,072,950 | Huber | Mar. 9, 1937 |
| 2,114,056 | Lohman | Apr. 12, 1938 |
| 2,222,608 | Elliott | Nov. 26, 1940 |
| 2,271,951 | Pearson | Feb. 3, 1942 |
| 2,317,259(A) | Doll | Apr. 20, 1943 |
| 2,338,028(B) | Doll | Dec. 28, 1943 |
| 2,330,394 | Stuart | Sept. 28, 1943 |
| 2,340,987 | Robidoux | Feb. 8, 1944 |

OTHER REFERENCES

"Tomorrow's Tools Today," vol. VIII, No. 2, 1942, article by J. C. Stick on pages 16–19.

"Geophysical Esploration," Heiland, pages 825–829. Published 1940 by Prentice-Hall, Inc., N. Y.